United States Patent
Lieberman

(10) Patent No.: US 9,188,954 B1
(45) Date of Patent: Nov. 17, 2015

(54) SYSTEMS AND METHODS FOR GENERATING NEGATIVES OF VARIABLE DIGITAL OPTICAL IMAGES BASED ON DESIRED IMAGES AND GENERIC OPTICAL MATRICES

(71) Applicant: NANOGRAFIX CORPORATION, San Diego, CA (US)

(72) Inventor: Daniel Lieberman, San Diego, CA (US)

(73) Assignee: NANOGRAFIX CORPORATION, San Diego, CA (US)

(*) Notice: Subject to any disclaimer, the term of this patent is extended or adjusted under 35 U.S.C. 154(b) by 0 days.

(21) Appl. No.: 14/634,671

(22) Filed: Feb. 27, 2015

Related U.S. Application Data

(60) Provisional application No. 62/114,014, filed on Feb. 9, 2015.

(51) Int. Cl.
  *H04N 15/00* (2006.01)
  *G03H 1/04* (2006.01)
(52) U.S. Cl.
  CPC .............. *G03H 1/04* (2013.01); *G03H 1/0493* (2013.01)
(58) Field of Classification Search
  USPC .......................................................... 348/41
  See application file for complete search history.

(56) References Cited

U.S. PATENT DOCUMENTS

| | | | |
|---|---|---|---|
| 5,138,471 A | 8/1992 | McGrew | |
| 5,396,839 A | 3/1995 | Rice | |
| 5,784,200 A | 7/1998 | Modegi | |
| 5,790,703 A * | 8/1998 | Wang | 358/3.28 |
| 6,317,226 B1 | 11/2001 | Yeh et al. | |
| 6,392,768 B1 | 5/2002 | Yeh et al. | |
| 7,193,754 B2 | 3/2007 | Borgsmuller et al. | |
| 7,729,027 B2 | 6/2010 | Matsuyama | |
| 7,796,318 B2 | 9/2010 | Woodgate et al. | |
| 7,893,005 B2 | 2/2011 | Funada et al. | |
| 7,934,752 B2 | 5/2011 | Saito et al. | |
| 8,760,988 B2 | 6/2014 | Nakamura | |
| 2002/0102007 A1* | 8/2002 | Wang | 382/100 |
| 2003/0067539 A1 | 4/2003 | Doerfel et al. | 348/51 |
| 2004/0101982 A1 | 5/2004 | Woontner | |
| 2004/0252867 A1 | 12/2004 | Lan et al. | 384/124 |
| 2005/0174620 A1 | 8/2005 | Woontner | |
| 2006/0098005 A1 | 5/2006 | Yung | |
| 2006/0250671 A1 | 11/2006 | Schwerdtner et al. | 359/9 |
| 2007/0109643 A1 | 5/2007 | Lee et al. | |
| 2007/0195391 A1 | 8/2007 | Nishikawa et al. | 359/15 |
| 2008/0192343 A1 | 8/2008 | Miyawaki et al. | 359/462 |
| 2008/0198468 A1* | 8/2008 | Kaule et al. | 359/575 |
| 2008/0199803 A1 | 8/2008 | Matsuyama | |
| 2008/0231925 A1 | 9/2008 | Tateishi et al. | |

(Continued)

*Primary Examiner* — Tracy Li
(74) *Attorney, Agent, or Firm* — Pillsbury Winthrop Shaw Pittman LLP

(57) ABSTRACT

Negatives of variable digital holographic images may be generated based on desired images and generic optical matrices. An original image may be obtained. A geometry associated with a generic optical matrix may be obtained. The generic optical matrix may have pixels corresponding to color and sub-pixels corresponding to non-color effects. The geometry may indicate locations and colors of pixels in the generic optical matrix, and locations and non-color effects of sub-pixels within the pixels. Color separation may be performed on an original image to provide two or more separations. The separations may be indexed to the geometry associated with the generic optical matrix to provide indexed separations. The indexed separations may be merged to provide a negative of the original image.

20 Claims, 6 Drawing Sheets

(56) References Cited

U.S. PATENT DOCUMENTS

| | | |
|---|---|---|
| 2008/0240787 A1 | 10/2008 | Saito et al. |
| 2008/0246897 A1 | 10/2008 | Gaudreau ............... 349/15 |
| 2008/0299332 A1 | 12/2008 | Matsuyama |
| 2009/0251749 A1 | 10/2009 | O'Boyle et al. ............. 359/2 |
| 2009/0303597 A1 | 12/2009 | Miyawaki et al. .......... 359/559 |
| 2010/0165134 A1 | 7/2010 | Dowski et al. ............. 348/218 |
| 2010/0171811 A1* | 7/2010 | Kamins-Naske et al. .... 348/40 |
| 2011/0002019 A1 | 1/2011 | Routley et al. ............. 359/9 |
| 2011/0187747 A1 | 8/2011 | McCarthy et al. .......... 345/634 |
| 2013/0215472 A1* | 8/2013 | Rossier et al. ............. 358/3.06 |
| 2013/0261782 A1 | 10/2013 | Becken et al. ............. 700/95 |
| 2015/0219807 A1 | 8/2015 | Lochbihler ................ 359/567 |

\* cited by examiner

SYSTEMS AND METHODS FOR GENERATING NEGATIVES OF VARIABLE DIGITAL OPTICAL IMAGES BASED ON DESIRED IMAGES AND GENERIC OPTICAL MATRICES

CROSS REFERENCE TO RELATED APPLICATIONS

This application claims the priority benefit of U.S. Provisional Patent Application No. 62/114,014 filed on Feb. 9, 2015 and entitled "SYSTEMS AND METHODS FOR GENERATING NEGATIVES OF VARIABLE DIGITAL OPTICAL IMAGES BASED ON DESIRED IMAGES AND GENERIC OPTICAL MATRICES," which is incorporated herein by reference.

FIELD OF THE DISCLOSURE

This disclosure relates to generating negatives of variable digital optical images based on desired images and generic optical matrices.

BACKGROUND

Optical images that create two-dimensional and/or three-dimensional effects may typically be printed using lenticular lens techniques or holographic techniques. As these different techniques have come to be used more and more, a need has arisen in the printing industry for the capability of generating such images quickly and at low cost and of integrating them into ink printing machinery so that they can easily be incorporated in printed materials such as labels, packaging, security printouts, and/or other printed materials. As it presently stands, these techniques generally involve long production waiting times and limited to specialized companies such as holographic companies.

Indeed, to date, the implementation of optical images that create two-dimensional and/or three-dimensional effects within printing applications has generally been costly and time-consuming. In the case of holograms, these may be produced by holographic companies that have very expensive equipment. The process may be slow and costly. Contemporary hologram technology may require companies that have an optical laboratory in which the hologram is made on a photoresist plate. The optical laboratory may include laser equipment, anti-vibration tables, other specialized equipment, and trained personnel. Once a hologram is initially made, it may be called a master, but it may not be used for large-scale production. As such, the company may also need an electroforming laboratory, where the photoresist master is introduced into a bath of nickel sulfamate for the purpose of cultivating a nickel copy on the surface of the photoresist. Once the nickel is of sufficient thickness, it may be separated from the photoresist copy in order to create a negative copy of the original image. It is from this nickel that the laboratory may cultivate a series of copies that may later be called nickel shims and may be used to engrave the image on a variety of supporting materials.

Next, in order to engrave the image, it may be necessary to have special equipment. Depending on the final product, there may be additional equipment for different applications. These processes often take several days and are processes that are completely distinct from ink printing. For the purpose of using these optical structures, the printers customarily rely on specialized companies (e.g., holographic companies) that generate the required images according to their needs. In addition to the investment of additional time needed to interface with those specialized companies, printers may be required to invest in equipment that enables the printer to transfer the optical structures onto their printed products.

SUMMARY

One aspect of the disclosure relates to a system configured for generating negatives of variable digital holographic images based on desired images and generic optical matrices. Exemplary implementations may enable printers throughout the world to have the capability to generate optical structures as if they were an additional "ink" at an additional "ink" station in their printing equipment. Some implementations may enable printers to vary the optical image that is being printed. The generic optical matrix may be used in conjunction with a negative and a UV lacquer (or other approach) to selectively obliterate certain pixels and/or sub-pixels to instantly create an optical image that may be used to print optical images in printing equipment.

While the present disclosure relates primarily to the generating the negative, itself, exemplary implementations for generic optical matrices are discussed in concurrently filed U.S. patent application Ser. No. 14/634,663 entitled "GENERIC OPTICAL MATRICES HAVING PIXELS CORRESPONDING TO COLOR AND SUB-PIXELS CORRESPONDING TO NON-COLOR EFFECTS, AND ASSOCIATED METHODS," and exemplary implementations for obliterating certain pixels and/or sub-pixels are described in concurrently filed U.S. patent application Ser. No. 14/634,648 entitled "SYSTEMS AND METHODS FOR FABRICATING VARIABLE DIGITAL OPTICAL IMAGES USING GENERIC OPTICAL MATRICES," which are both incorporated herein by reference.

Exemplary implementations may provide to printers an ability to control all aspects of their production, including the generation of complex optical images (e.g., holograms) without having to invest in expensive and complex optics and equipment for the application thereof. In other words, exemplary implementations may facilitate continuous systems that are easily and inexpensively integrated into printers' prepress and production departments. As a result, printers may be able to supply their clients quickly with a combination of prints and complex optical images at reasonable cost during prepress and production.

Some implementations may facilitate instantly or rapidly creating optical structures on a large-scale to create many types of images without the use of laser, electroforming, expensive molds, and/or embossing equipment. Applications of these optical structures may include emphasizing the aesthetic effect of a label; providing 3D prints for augmented reality and/or virtual reality systems (e.g., Microsoft® HoloLens™); making packaging more attractive to the consumer; adding security to government documents, paper currency, credit cards, passports, labels, packaging, and/or other security applications; and/or other applications.

According to some implementations, they may facilitate recording, molding, and/or printing optical structures in such a manner that they turn out to be variable, meaning that after individual printing cycles a new and different optical image can be instantly produced. For example, an optical image may change from label to label with a purpose of increasing security of the product on which the label has been adhered, and/or with a purpose of personalizing packaging with a unique optical characteristic for individual packages. This is digital printing of optical structures.

Some implementations may be used with traditional printing equipment, digital equipment, desktop printers, and/or other equipment setups with the purpose of producing optical structures continuously or on demand with the ink printing of these machines. As such, the cost of generating these optical images may be dramatically reduced and may approach costs that are more similar to those of pre-printing in the printing industry.

In contrast to contemporary technologies for generating optical images, exemplary implementations may not require creating a new image from the ground up every time a new or altered image is desired. According to some implementations, the generic optical matrix may be used to instantly generate some type of image which can later be engraved, molded, displayed on 3D monitors or other displays, and/or be combined with prints from other printing techniques involving conventional printing equipment, rotogravure, inkjet printing, digital printing, offset printing, laser printing, desktop printers, laser coders, inkjet encoding equipment, flexographic printing, and/or other printing techniques.

In accordance with some implementations, the system may comprise one or more physical processors configured by machine-readable instructions to obtain an original image. The one or more physical processor may be configured by machine-readable instruction to obtain a geometry associated with a generic optical matrix. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. The one or more physical processor may be configured by machine-readable instruction to perform color separation on the original image to provide two or more separations including a first separation and a second separation. The first separation may correspond to the first color. The second separation may correspond to the second color. The one or more physical processor may be configured by machine-readable instruction to index the separations to the geometry associated with the generic optical matrix to provide indexed separations. The first separation may be indexed to the geometry with respect to the first color and the first non-color effect to provide an indexed first separation associated with the first non-color effect. The first separation may be indexed to the geometry with respect to the first color and the second non-color effect to provide an indexed first separation associated with the second non-color effect. The second separation may be indexed to the geometry with respect to the second color and the first non-color effect to provide an indexed second separation associated with the first non-color effect. The second separation may be indexed to the geometry with respect to the second color and the second non-color effect to provide an indexed second separation associated with the second non-color effect. The one or more physical processor may be configured by machine-readable instruction to merge the indexed separations to provide a negative of the original image.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
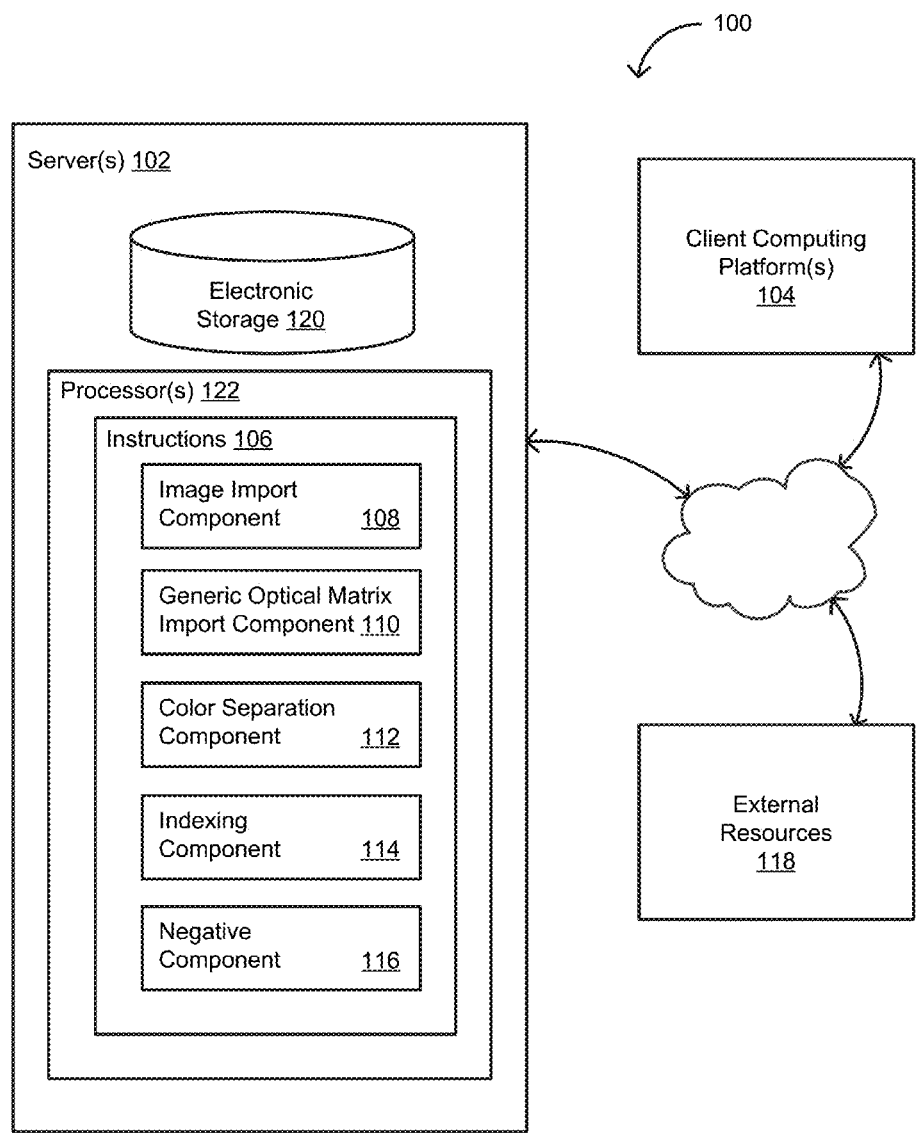
FIG. 1 illustrates a system configured for generating negatives of variable digital holographic images based on desired images and generic optical matrices, in accordance with one or more implementations.
Figure 2:
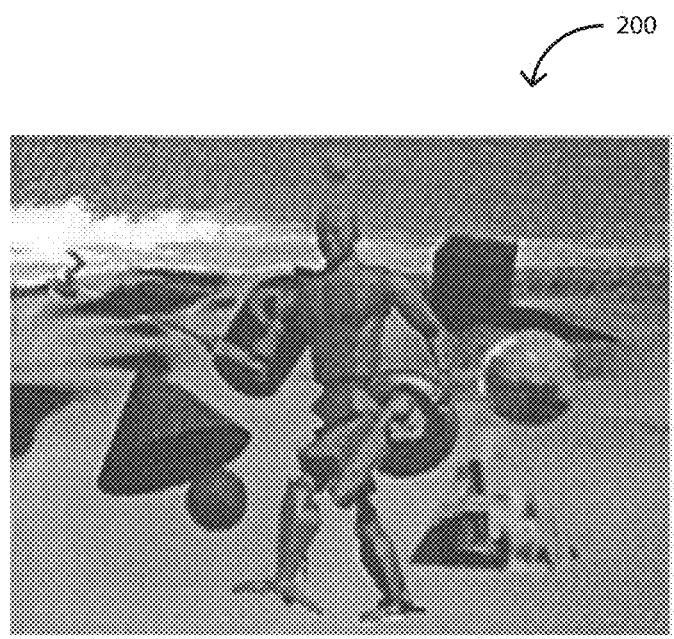
FIG. 2 illustrates an exemplary original image used for explanatory purposes throughout the present application.

FIG. 1 illustrates a system 100 configured for generating negatives of variable digital holographic images based on desired images and generic optical matrices, in accordance with one or more implementations. In some implementations, system 100 may include a server 102. The server 102 may be configured to communicate with one or more client computing platforms 104 according to a client/server architecture. The users may access system 100 via client computing platforms 104. The server(s) 102 may be configured to execute machine-readable instructions 106. The machine-readable instructions 106 may include one or more of an image import component 108, a generic optical matrix import component 110, a color separation component 112, an indexing component 114, a negative component 116, and/or other components The image import component 108 may be configured to obtain an original image. The original image may include a physical likeness or representation of a person, animal, or thing that is photographed, painted, and/or otherwise made visible. The original image may be in an electronic format. Examples of electronic formats may include one or more of JPEG, TIFF, GIF, BMP, PNG, DDS, TARGA, DWG, PRT, CMX, EPS, SVG, STL, ART, AI, PSD, PMD, QXD, DOC, 3DS, BLEND, DFF, FBX, MA, MAX, SKP, VRML, BAT, JSFL, CLS, JAVA, MPEG, RM, SWF, PAGES, PCX, PDD, SCT, DXF, DWF, SLDASM, WRL, and/or other electronic formats. The original image may be obtained from sources within system 100 and/or external resources 118. FIG. 2 illustrates an exemplary original image 200 used for explanatory purposes throughout the present application. The exemplary original image 200 depicts a figure in the foreground and several shapes in the foreground and background, all in various colors and shades. The exemplary original image 200 is in no way limiting as any image may be used as an original image, in accordance with one or more implementations.

Referring again to FIG. 1, generic optical matrix import component 110 may be configured to obtain a geometry associated with a generic optical matrix. The generic optical matrix may have pixels corresponding to color and sub-pixels corresponding to non-color effects. Exemplary implementations of generic optical matrices are described is U.S. patent application Ser. No. 14/634,663, incorporated supra. The pixels may include first pixels corresponding to a first color and second pixels corresponding to a second color. The pixels may further include third pixels corresponding to a third color. The pixels may further include fourth pixels corresponding to a fourth color. The first, second, third, and fourth colors may all be different from each other. In some implementations, the pixels may correspond to red, green, and blue (RGB). In some implementations, the pixels may correspond to cyan, magenta, yellow, and black (CMYK). According to various implementations, the pixels may correspond to any number of colors.

The sub-pixels of the generic optical matrix may include first sub-pixels corresponding to a first non-color effect and second sub-pixels corresponding to a second non-color effect. The sub-pixels may further include third sub-pixels corresponding to a third non-color effect. The sub-pixels may further include fourth sub-pixels corresponding to a fourth non-color effect. According to various implementations, the sub-pixels may correspond to any number of non-color effects. Examples of non-color effects may relate to one or more of viewing angle, viewing distance, polarization, intensity, scattering, refractive index, birefringence, and/or other non-color effects. In some implementations, the first sub-pixels may corresponding to the first non-color effect may be configured to cause light reflected or transmitted by the first sub-pixels to be directed toward a left eye of a person observing the generic optical matrix from a first viewing angle. The second sub-pixels corresponding to the second non-color effect may be configured to cause light reflected or transmitted by the second sub-pixels to be directed toward a right eye of the person observing the generic optical matrix from the first viewing angle.

The geometry associated with the generic optical matrix may indicate locations and colors of pixels in the generic optical matrix. The geometry may indicate locations and non-color effects of sub-pixels within the pixels. In some implementations, the geometry may convey information associates with individual pixels and/or sub-pixels. In some implementations, the geometry may convey information associated with an aggregate of individual pixels and/or sub-pixels such as arrangement, spacing, shape, motif, pattern, and/or other information associated with an aggregate of individual pixels and/or sub-pixels.

Figure 3A:
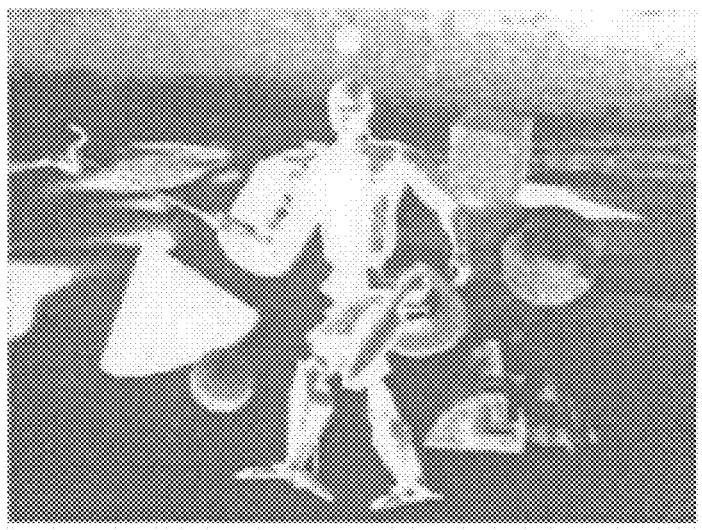
FIGS. 3A, 3B, and 3C illustrate exemplary separations corresponding to the exemplary original image of FIG. 2.
Figure 3B:
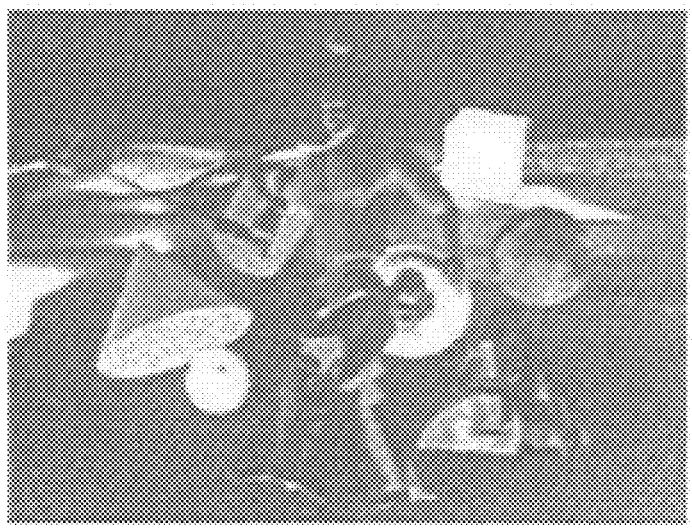
Figure 3C:
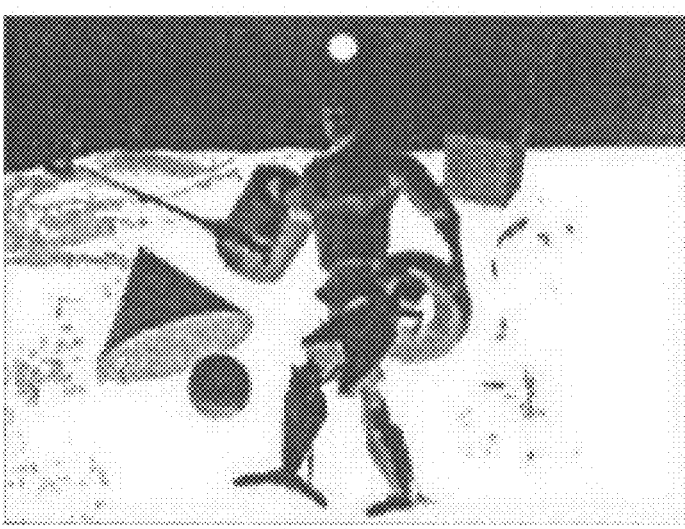

The color separation component 112 may be configured to perform color separation on the original image to provide two or more separations. Generally speaking, a separation may represent a single color component of an image. By way of non-limiting example, the separations may include a first separation and a second separation. The first separation may correspond to the first color corresponding to the first pixels of the generic optical matrix. The second separation may correspond to the second color of the second pixels of the generic optical matrix. In implementations having third pixels corresponding to a third color, the separations may include a third separation corresponding to the third color. In implementations having fourth pixels corresponding to a fourth color, the separations may include a fourth separation corresponding to the fourth color. According to various implementations, there may be any number of separations. FIGS. 3A, 3B, and 3C respectively illustrate exemplary separation 302, separation 304, and separation 306, which correspond to exemplary original image 200 of FIG. 2. The separation 302 corresponds to the red component of exemplary original image 200. The separation 304 corresponds to the green component of exemplary original image 200. The separation 306 corresponds to the blue component of exemplary original image 200. In some implementations, individual colors may have one or more separations based on the different sub-pixels. For example, a full color RGB 3D image may have two separations per color (e.g., left and right) totaling six separations. In some implementations, the number of separations may correspond to the number of desired viewing angles, viewing distances, viewpoints, and/or other viewing information.

Turning again to FIG. 1, indexing component 114 may be configured to index the separations to the geometry associated with the generic optical matrix to provide indexed separations. Continuing the example from the above-paragraph, the first separation may be indexed to the geometry with respect to the first color and the first non-color effect to provide an indexed first separation associated with the first non-color effect. The first separation may be indexed to the geometry with respect to the first color and the second non-color effect to provide an indexed first separation associated with the second non-color effect. The second separation may be indexed to the geometry with respect to the second color and the first non-color effect to provide an indexed second separation associated with the first non-color effect. The second separation may be indexed to the geometry with respect to the second color and the second non-color effect to provide an indexed second separation associated with the second non-color effect.

Figure 4:
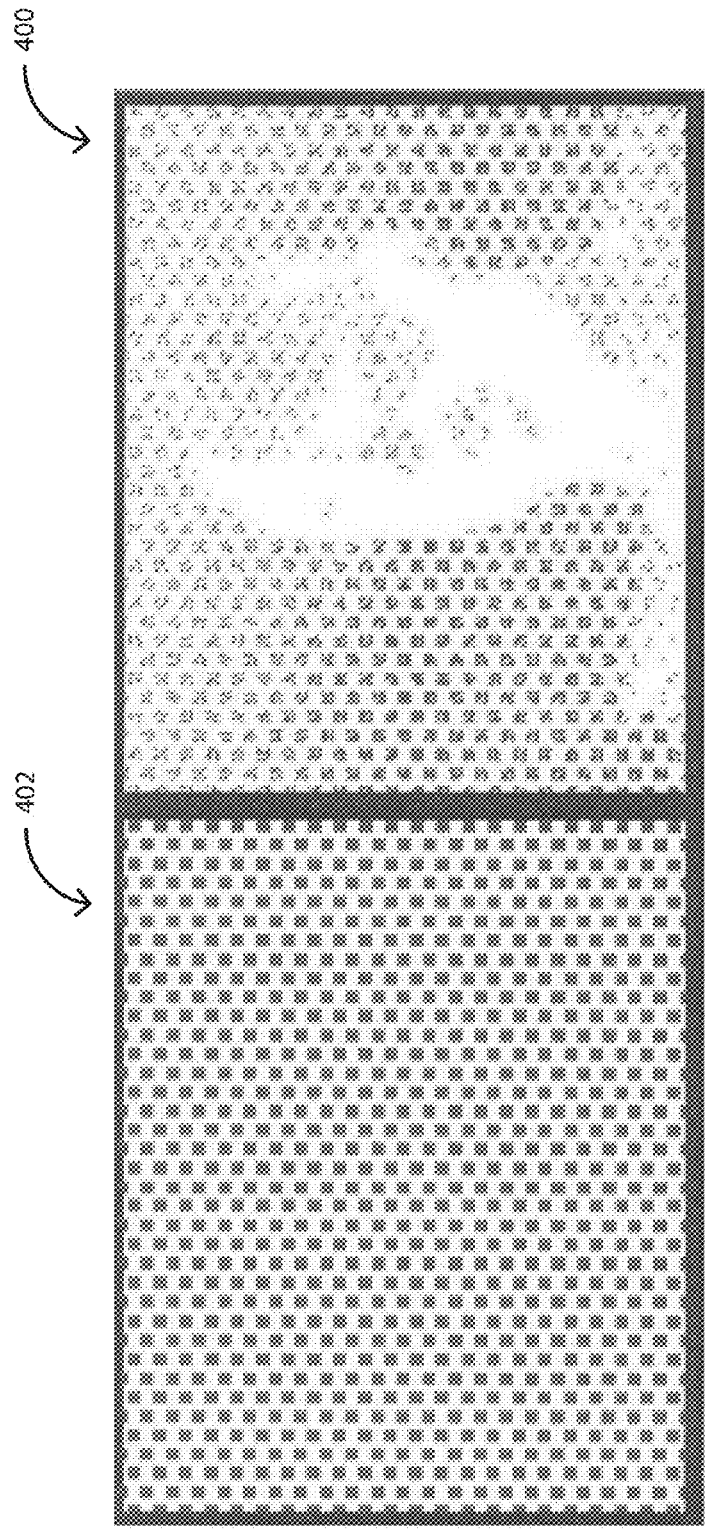
FIG. 4 illustrates an exemplary indexed separation corresponding to the exemplary original image of FIG. 2.

In some implementations, a given separation corresponding to a given color may be indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect. Unpreserved areas of the given separation may be obliterated. In some implementations, a given separation corresponding to a given color may be indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect. Unobliterated areas of the given separation may be preserved. FIG. 4 illustrates an exemplary indexed separation 400 corresponding the exemplary original image 200 of FIG. 2. For illustrative purposes, the exemplary indexed separation 400 shows only the head region of the figure depicted in exemplary original image 200. In FIG. 4, the left panel shows pixels 402 corresponding to the color red in a generic optical matrix. In the right panel of FIG. 4, exemplary indexed separation 400 is created by determining which areas of separation 302 (see FIG. 3) spatially correspond to pixels of the generic optical matrix show in the left panel of FIG. 4. Where there is spatial correspondence, separation 302 is preserved. Where there is no spatial correspondence, separation 302 is obliterated.

Figure 5:
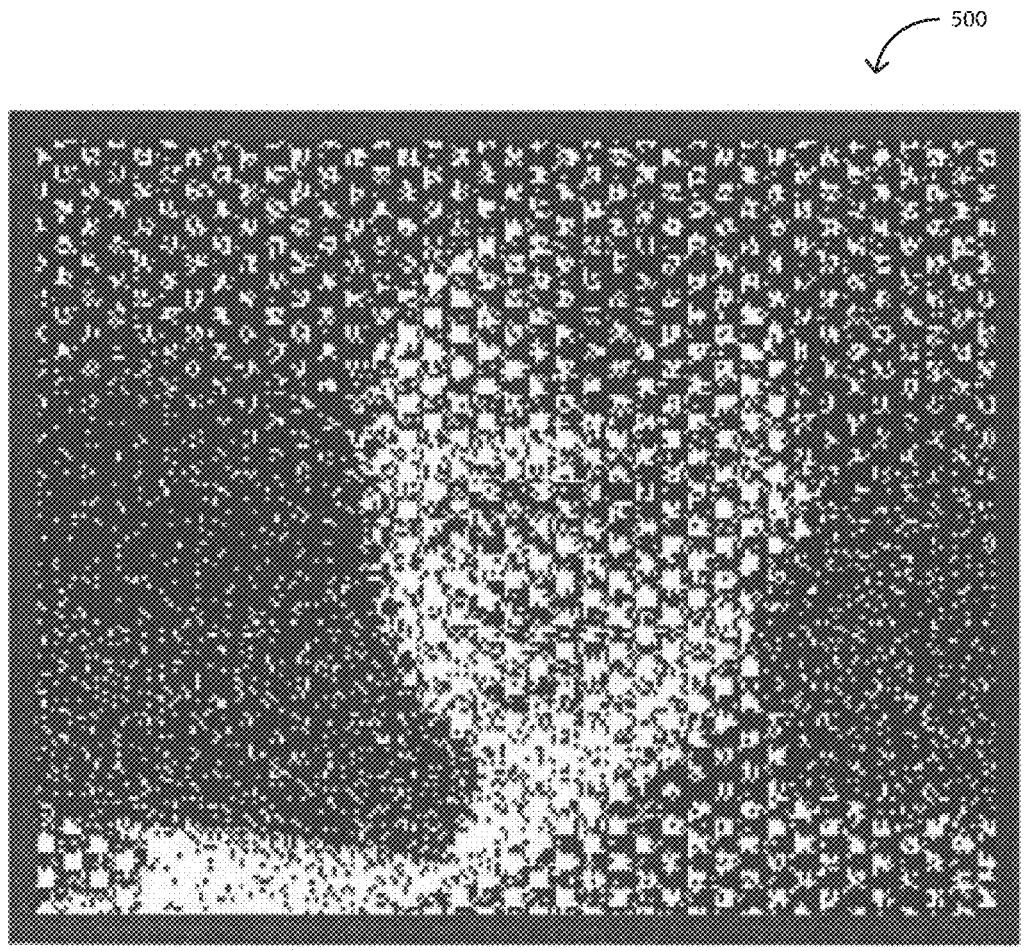
FIG. 5 illustrates an exemplary negative corresponding to the exemplary original image of FIG. 2.

Looking again at FIG. 1, negative component 116 may be configured to merge the indexed separations to provide a negative of the original image. Continuing the example made above in connection with indexing component 114, the indexed first separation associated with the first non-color effect, the indexed first separation associated with the second non-color effect, the indexed second separation associated with the first non-color effect, and the indexed second separation associated with the second non-color effect may be merged by combining the preserved areas while maintaining the spatial position of the preserved areas. In some implementations, the indexed first separation associated with the first non-color effect, the indexed first separation associated with the second non-color effect, the indexed second separation associated with the first non-color effect, and the indexed second separation associated with the second non-color effect may be merged by combining the obliterated areas while maintaining the spatial position of the obliterated areas. FIG. 5 illustrates an exemplary negative 500 corresponding to the exemplary original image of FIG. 2. For illustrative purposes, the exemplary negative 500 shows only the head region of the figure depicted in exemplary original image 200. The exemplary negative 500 was created by merging indexed separation 400 (see FIG. 4) with indexed separations corresponding to other colors and/or non-color effects such that the preserved areas were combined while maintain the relative spatial position of the preserved areas.

Returning to FIG. 1, server(s) 102, client computing platform(s) 104, and/or external resources 118 may be operatively linked via one or more electronic communication links, in some implementations. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute machine-readable instructions. The machine-readable instructions may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, and/or other computing platforms.

External resources 118 may include sources of information, hosts and/or providers of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute machine-readable instruction components 108, 110, 112, 114, 116, and/or other components. Processor(s) 122 may be configured to execute machine-readable instruction components 108, 110, 112, 114, 116, and/or other components by software; hardware; firmware; some combination of software, hardware, and/or firmware; and/or other mechanisms for configuring processing capabilities on processor(s) 122. As used herein, the term "machine-readable instruction component" may refer to any component or set of components that perform the functionality attributed to the machine-readable instruction component. This may include one or more physical processors during execution of machine-readable instructions, the machine-readable instructions, circuitry, hardware, storage media, and/or any other components.

It should be appreciated that although machine-readable instruction components 108, 110, 112, 114, and 116 are illustrated in FIG. 1 as being implemented within a single processing unit, in implementations in which processor(s) 122 includes multiple processing units, one or more of machine-readable instruction components 108, 110, 112, 114, and/or 116 may be implemented remotely from the other machine-readable instruction components. The description of the functionality provided by the different machine-readable instruction components 108, 110, 112, 114, and/or 116 described herein is for illustrative purposes, and is not intended to be limiting, as any of machine-readable instruction components 108, 110, 112, 114, and/or 116 may provide more or less functionality than is described. For example, one or more of machine-readable instruction components 108, 110, 112, 114, and/or 116 may be eliminated, and some or all of its functionality may be provided by other ones of machine-readable instruction components 108, 110, 112, 114, and/or 116. As another example, processor(s) 122 may be configured to execute one or more additional machine-readable instruction components that may perform some or all of the functionality attributed herein to one of machine-readable instruction components 108, 110, 112, 114, and/or 116.

Figure 6:
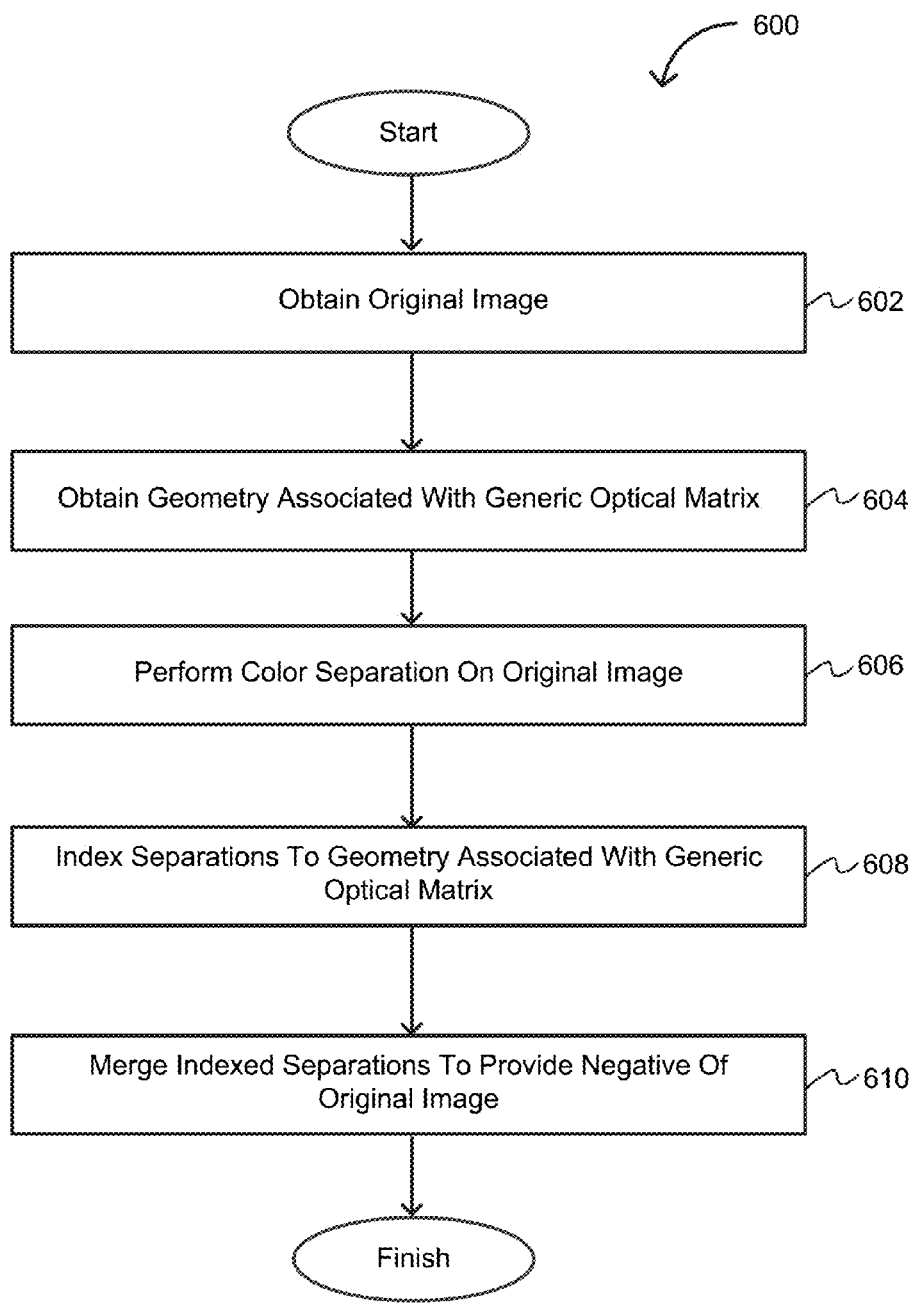
FIG. 6 illustrates a method for generating negatives of variable digital holographic images based on desired images and generic optical matrices, in accordance with one or more implementations.

FIG. 6 illustrates a method 600 for generating negatives of variable digital holographic images based on desired images and generic optical matrices, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an original image may be obtained. Operation 602 may be performed by one or more processors configured to execute an image import component that is the same as or similar to image import component 108, in accordance with one or more implementations.

At an operation 604, a geometry associated with a generic optical matrix may be obtained. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. Operation 604 may be performed by one or more processors configured to execute a generic optical matrix import component that is the same as or similar to generic optical matrix import component 110, in accordance with one or more implementations.

At an operation 606, color separation may be performed on the original image to provide two or more separations including a first separation and a second separation. The first separation may correspond to the first color and the second separation corresponding to the second color. Operation 606 may be performed by one or more processors configured to execute a color separation component that is the same as or similar to color separation component 112, in accordance with one or more implementations.

At an operation 608, the separations may be indexed to the geometry associated with the generic optical matrix to provide indexed separations. The first separation may be indexed to the geometry with respect to the first color and the first non-color effect to provide an indexed first separation associated with the first non-color effect. The first separation may be indexed to the geometry with respect to the first color and the second non-color effect to provide an indexed first separation associated with the second non-color effect. The second separation may be indexed to the geometry with respect to the second color and the first non-color effect to provide an indexed second separation associated with the first non-color effect. The second separation may be indexed to the geometry with respect to the second color and the second non-color effect to provide an indexed second separation associated with the second non-color effect. Operation 608 may be performed by one or more processors configured to execute an indexing component that is the same as or similar to indexing component 114, in accordance with one or more implementations.

At an operation 610, the indexed separations may be merged to provide a negative of the original image. Operation 610 may be performed by one or more processors configured to execute a negative component that is the same as or similar to negative component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating negatives of variable digital holographic images based on desired images and generic optical matrices, the system comprising:
   one or more physical processors configured by machine-readable instructions to:
      obtain an original image;
      obtain a geometry associated with a generic optical matrix, the generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels;
      perform color separation on the original image to provide two or more separations including a first separation and a second separation, the first separation corresponding to the first color and the second separation corresponding to the second color;
      index the separations to the geometry associated with the generic optical matrix to provide indexed separations, the first separation being indexed to the geometry with respect to the first color and the first non-color effect to provide an indexed first separation associated with the first non-color effect, the first separation being indexed to the geometry with respect to the first color and the second non-color effect to provide an indexed first separation associated with the second non-color effect, the second separation being indexed to the geometry with respect to the second color and the first non-color effect to provide an indexed second separation associated with the first non-color effect, the second separation being indexed to the geometry with respect to the second color and the second non-color effect to provide an indexed second separation associated with the second non-color effect; and
      merge the indexed separations to provide a negative of the original image.

2. The system of claim 1, wherein:
the pixels further include third pixels corresponding to a third color; and
the two or more separations further include a third separation corresponding to the third color.

3. The system of claim 2, wherein:
the pixels further include fourth pixels corresponding to a fourth color; and
the two or more separations further include a fourth separation corresponding to the fourth color.

4. The system of claim 1, wherein a given separation corresponding to a given color is indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect, unpreserved areas of the given separation being obliterated.

5. The system of claim 4, wherein the indexed first separation associated with the first non-color effect, the indexed first separation associated with the second non-color effect, the indexed second separation associated with the first non-color effect, and the indexed second separation associated with the second non-color effect are merged by combining the preserved areas while maintaining the spatial position of the preserved areas.

6. The system of claim 1, wherein a given separation corresponding to a given color is indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect, unobliterated areas of the given separation being preserved.

7. The system of claim 6, wherein the indexed first separation associated with the first non-color effect, the indexed first separation associated with the second non-color effect, the indexed second separation associated with the first non-color effect, and the indexed second separation associated with the second non-color effect are merged by combining the obliterated areas while maintaining the spatial position of the obliterated areas.

8. The system of claim 1, wherein:
the first sub-pixels corresponding to the first non-color effect are configured to cause light reflected or transmitted by the first sub-pixels to be directed toward a left eye of a person observing the generic optical matrix from a first viewing angle; and
the second sub-pixels corresponding to the second non-color effect are configured to cause light reflected or transmitted by the second sub-pixels to be directed toward a right eye of the person observing the generic optical matrix from the first viewing angle.

9. A method for generating negatives of variable digital holographic images based on desired images and generic optical matrices, the method being performed by one or more physical processors configured by machine-readable instruction, the method comprising:
obtaining an original image;
obtaining a geometry associated with a generic optical matrix, the generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels;
performing color separation on the original image to provide two or more separations including a first separation and a second separation, the first separation corresponding to the first color and the second separation corresponding to the second color;
indexing the separations to the geometry associated with the generic optical matrix to provide indexed separations, the first separation being indexed to the geometry with respect to the first color and the first non-color effect to provide an indexed first separation associated with the first non-color effect, the first separation being indexed to the geometry with respect to the first color and the second non-color effect to provide an indexed first separation associated with the second non-color effect, the second separation being indexed to the geometry with respect to the second color and the first non-color effect to provide an indexed second separation associated with the first non-color effect, the second separation being indexed to the geometry with respect to the second color and the second non-color effect to provide an indexed second separation associated with the second non-color effect; and
merging the indexed separations to provide a negative of the original image.

10. The method of claim 9, wherein:
the pixels further include third pixels corresponding to a third color; and
the two or more separations further include a third separation corresponding to the third color.

11. The method of claim 10, wherein:
the pixels further include fourth pixels corresponding to a fourth color; and
the two or more separations further include a fourth separation corresponding to the fourth color.

12. The method of claim 9, wherein a given separation corresponding to a given color is indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect, unpreserved areas of the given separation being obliterated.

13. The method of claim 12, wherein the indexed first separation associated with the first non-color effect, the indexed first separation associated with the second non-color effect, the indexed second separation associated with the first non-color effect, and the indexed second separation associated with the second non-color effect are merged by combining the preserved areas while maintaining the spatial position of the preserved areas.

14. The method of claim 9, wherein a given separation corresponding to a given color is indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect, unobliterated areas of the given separation being preserved.

15. The method of claim 14, wherein the indexed first separation associated with the first non-color effect, the indexed first separation associated with the second non-color effect, the indexed second separation associated with the first non-color effect, and the indexed second separation associated with the second non-color effect are merged by combining the obliterated areas while maintaining the spatial position of the obliterated areas.

16. The method of claim 9, wherein:
the first sub-pixels corresponding to the first non-color effect are configured to cause light reflected or transmitted by the first sub-pixels to be directed toward a left eye of a person observing the generic optical matrix from a first viewing angle; and
the second sub-pixels corresponding to the second non-color effect are configured to cause light reflected or transmitted by the second sub-pixels to be directed toward a right eye of the person observing the generic optical matrix from the first viewing angle.

17. A non-transitory computer-readable storage medium having instructions embodied thereon, the instructions being executable by one or more physical processors to perform a method for generating negatives of variable digital holographic images based on desired images and generic optical matrices, the method comprising:
obtaining an original image;
obtaining a geometry associated with a generic optical matrix, the generic optical matrix having pixels corresponding to color and sub-pixels corresponding to non-color effects, the pixels including first pixels corresponding to a first color and second pixels corresponding to a second color, the sub-pixels including first sub-pixels corresponding to a first non-color effect and second sub-pixels corresponding to a second non-color effect, the geometry indicating locations and colors of pixels in the generic optical matrix, the geometry further indicating locations and non-color effects of sub-pixels within the pixels;
performing color separation on the original image to provide two or more separations including a first separation and a second separation, the first separation corresponding to the first color and the second separation corresponding to the second color;
indexing the separations to the geometry associated with the generic optical matrix to provide indexed separations, the first separation being indexed to the geometry with respect to the first color and the first non-color effect to provide an indexed first separation associated with the first non-color effect, the first separation being indexed to the geometry with respect to the first color and the second non-color effect to provide an indexed first separation associated with the second non-color effect, the second separation being indexed to the geometry with respect to the second color and the first non-color effect to provide an indexed second separation associated with the first non-color effect, the second separation being indexed to the geometry with respect to the second color and the second non-color effect to provide an indexed second separation associated with the second non-color effect; and
merging the indexed separations to provide a negative of the original image.

18. The storage medium of claim 17, wherein a given separation corresponding to a given color is indexed to the geometry associated with the generic optical matrix with respect to a given non-color effect by preserving areas of the given separation that spatially correspond to pixels of the generic optical matrix corresponding to the given color and sub-pixels within the pixels corresponding to the given non-color effect, unpreserved areas of the given separation being obliterated.

19. The storage medium of claim 18, wherein the indexed first separation associated with the first non-color effect, the indexed first separation associated with the second non-color effect, the indexed second separation associated with the first non-color effect, and the indexed second separation associated with the second non-color effect are merged by combining the preserved areas while maintaining the spatial position of the preserved areas.

20. The storage medium of claim 17, wherein a given separation corresponding to a given color is indexed to the geometry associated with the generic optical matrix with respect to a given non-color effect by obliterating areas of the given separation that spatially correspond to pixels of the generic optical matrix corresponding to the given color and sub-pixels within the pixels corresponding to the given non-color effect, unobliterated areas of the given separation being preserved.

* * * * *